Patented Oct. 27, 1953

2,657,181

UNITED STATES PATENT OFFICE 2,657,181

HYDRAULIC FLUID CONTAINING POLY-(OXYETHYLENE - OXY - 1,2 PROPYLENE) ETHERS OF GLYCEROL

John C. Van Horn, Midland, Edward O. Ohlmann, Bay City, James D. Klinger, Detroit, and John H. Wright, Berkley, Mich.; said Van Horn and said Ohlmann assignors to The Dow Chemical Company, Midland, Mich., a corporation of Delaware No Drawing. Application June 6, 1951,
Serial No. 230,256

7 Claims. (Cl. 252—73)

This invention relates to new hydraulic fluids.

A hydraulic fluid, if it is to be used in automotive or aircraft hydraulic brake systems, must meet a variety of requirements. It should be chemically stable, nearly non-volatile, and of low flammability, and yet should remain a homogeneous flowable liquid at temperatures as low as —60° F. It should have a viscosity which is appropriate for the intended service and which changes but little with temperature. It must act as a lubricant for moving parts of the brake system, and should not attack, corrode, or deposit gummy residue on the materials of which the system is made. In particular, it must have little or no tendency to swell or deteriorate cups, washers, and other rubber parts. In addition, it should have good tolerance for water and also be miscible with and inert to all commonly used hydraulic fluids.

It is therefore the principal object of this invention to provide new mixtures which approach the desirable properties of the ideal hydraulic brake fluid more closely than any fluid available heretofore.

The fluids of the invention are mixtures consisting essentially of (a) a complex liquid mixture of certain polyoxyalkylene ethers of glycerol as the essential non-volatile lubricating component, (b) a larger proportion of a monohydric alcohol as a solvent or thinner, and optionally (c) a small proportion of a glycol as adjuvant.

The glyceryl ether or lubricant component is, specifically, a mixture of trihydroxy mixed poly (oxyethylene-oxy-1,2 propylene) ethers of glycerol in which the oxyethylene groups represent from 20 to 80 mol per cent of the total oxyalkylene groups and in which there is an average of at least 8 oxyalkylene groups per glycerol molecule. These products are most readily prepared by the condensation of a mixture of ethylene oxide and propylene oxides with glycerol in the presence of an alkali metal hydroxide as catalyst under moderate pressure at a temperature of from about 100° to about 140° C. The properties of the condensate depend somewhat on the ratio of ethylene oxide to propylene oxide in the reactant oxide mixture and also on the number of moles of oxide mixture condensed per mole of glycerol. Details of the manner of carrying out the condensation, and of the properties of the resulting products, are more fully set forth in a copending application Serial No. 192,603, filed October 27, 1950 by L. H. Horsley et al. As there explained, due to the random manner in which the ethylene oxide and propylene oxide molecules add to each glycerol nucleus, the final product is in all cases an extremely complex mixture of glyceryl ethers having polyoxyalkylene chains of different lengths and different internal configurations with a free hydroxyl group at the end of each of the polyoxyalkylene chains, a glycerol nucleus being at the other end.

The fluids according to the invention are best formulated from trihydroxy mixed poly (oxyethylene-oxy 1,2 propylene) ethers of glycerol in which the oxyethylene groups represent from 33 to 60 per cent of the total oxyalkylene groups and in which the mixture has an average molecular weight (by acetyl value) of at least 850. For heavy duty hydraulic brake fluids, optimum results are obtained when the aforesaid glyceryl ether is one in which the oxyethylene groups represent about 50 per cent of the total oxyalkylene groups and in which there are a sufficient average number of oxyalkylene groups that the condensate has a viscosity at 100° F. of about 200 centistokes. This latter product may be prepared by the condensation of an equimolecular mixture of ethylene oxide and propylene oxide with glycerol in the ratio of about 70 to 75 moles of oxide mixture per mole of glycerol; it has a specific gravity at 25° C. of 1.05 and a refractive index of 1.460.

The solvent or thinner component of the new hydraulic fluids is an acyclic monohydric alcohol containing at least 3, and preferably at least 4, but not more than 10 carbon atoms, per molecule, or a mixture of two or more such alcohols. Typical of the alcohols which may be used are: n-butanol, isoamyl alcohol, methyl amyl alcohol, isooctyl alcohol, 2-ethoxyethanol (ethylene glycol monoethyl ether); 2-butoxyethanol (ethylene glycol monobutyl ether); 1- methoxy-2-propanol (propylene glycol monomethyl ether), dipropylene glycol monomethyl ether, and tripropylene glycol monomethyl ether. It will be noted that all these alcohols contain only carbon, hydrogen, and oxygen atoms and are free of acidic and hydrolyzable groups. In formulating a hydraulic fluid, the choice of which alcohol or mixture of alcohols is to be used is determined by the boiling point, viscosity, and low-temperature behavior desired for the final fluid. For instance, for a heavy-duty hydraulic brake fluid, the preferred alcohols are butoxyethanol, diethylene glycol monoethyl ether, dipropylene glycol monomethyl ether, and dipropylene glycol monoethyl ether because of their low volatilities.

A desirable third component of a hydraulic fluid according to the invention is an acyclic glycol containing from 2 to 6 carbon atoms per molecule. Typical are ethylene glycol, propylene glycol, diethylene glycol, dipropylene glycol, and 2-methyl-2,4 pentanediol. These compounds all are dihydroxy alkanes or dihydroxy aliphatic ethers and contain no atoms other than carbon, hydrogen, and oxygen, and no functional groups other than the hydroxyl group. The function of the glycol in the hydraulic fluid is to minimize any tendency of the other components to cause swelling of rubber, to reduce volatility, and to permit precise adjustment of viscosity when necessary.

In the fluids according to the invention, the polyoxyalkylene glyceryl ether lubricant should represent from 10 to 30 per cent by weight of the final formula, with 15 to 25 per cent being usually preferred. The monohydric alcohol solvent is the major component, and should constitute from 55 to 90 per cent of the fluid, if a glycol is present, and from 70 to 90 per cent if it is absent. Values in the range of 65 to 80 per cent are most satisfactory. The glycol may advantageously be added in any proportion up to about 30 per cent, with 5 to 20 per cent being preferred. Within these ranges, the relative proportions may be adjusted empirically to produce the precise combination of properties which may be required for any particular service.

In addition to the components previously discussed, the fluids of the invention may optionally contain small proportions, usually not over one or two per cent, of other agents, such as corrosion inhibitors, neutralizing agents, oxidation inhibitors, dyes, odorants, or other materials added to meet specialized service conditions or to enhance sales appeal. For some uses, as in hydraulically-actuated power machinery, lifts, etc., of where non-flammability under all conditions is essential, substantial proportions of water may be blended with the fluid.

The invention may be further understood by reference to the following examples, which are illustrative only. In all the examples, the lubricant component used was the preferred glyceryl ether mixture referred to previously, viz. the condensation product of approximately 70 moles of an equimolecular mixture of ethylene oxide and propylene oxide per mole of glycerol, such product having a viscosity at 100° F. of about 200 centistokes, and an average molecular weight of about 2600 (by acetyl value).

*Example 1*

A heavy-duty hydraulic brake fluid was prepared by mixing together 20 parts by weight of the glyceryl ether lubricant, 65 parts of "Carbitol" solvent (a proprietary composition consisting mainly of diethylene glycol monoethyl ether) and 15 parts of diethylene glycol. The resulting fluid had a viscosity in centistokes as follows: at 130° F., 8.15; at 32° F., 63.9; and at —40° F., 1819. The reflux boiling point at atmospheric pressure was 387° F. When rubber was exposed to the fluid at 158° F. according to the standard Society of Automotive Engineers Test (S. A. E. Handbook, 1948, pp. 553–562) the swelling was only 0.7 per cent. Even after being cooled at —60° F. for 6 hours, the fluid was still pourable and remained entirely clear and homogeneous.

*Example 2*

A heavy-duty hydraulic brake fluid was prepared by mixing together 20 parts by weight of the glyceryl ether lubricant, 70 parts of dipropylene glycol monomethyl ether, and 10 parts of ethylene glycol. In addition, 0.8 per cent by weight of a polyhydric phenol oxidation inhibitor and 0.4 per cent of borax as a metallic corrosion inhibitor were added. The final fluid had a viscosity in centistokes as follows: at 130° F., 5.76; at 32° F., 44.9; and at —40° F., 1376. The reflux boiling point was 356° F., the open cup flash point 190° F., and the specific gravity at 77° F., 0.99. After 6 hours at —60° F., and after 6 days at —40° F., it was entirely clear, homogeneous, and readily pourable. It exhibited excellent water tolerance both at 140° F. and at —40° F. In a series of accelerated corrosion tests at 158° F. for 120 hours against tinned iron, steel, aluminum, cast iron, brass, and copper, the corrosion rate in no case exceeded 0.04 milligrams per square centimeter. In an accelerated evaporation test for 48 hours at 210° F., the weight loss was only 79.5 per cent; the residue remained fluid after 2 hours at 32° F. In the rubber swelling test as in the previous example, the value was 3.1 per cent.

*Example 3*

A hydraulic brake fluid for service in extreme cold was prepared by mixing 20 parts by weight of the glyceryl ether lubricant, 65 parts of n-butanol, and 15 parts of propylene glycol. The viscosity in centistokes of the fluid was, at 130° F., 4.4; at 32° F., 23.0; and at —40° F., 189. In the rubber swelling test of the previous examples, the value was 2.6 per cent. The fluid remained clear, homogeneous, and free-flowing after 6 hours at —60° F.

The advantageous properties of the hydraulic fluids of the present invention are attributable only in part to the inherent qualities of the particular polyoxyalkylene glyceryl ethers used as the lubricant component. They are at least equally the result of the fact that in blending these glyceryl ether lubricants with monohydric alcohols, the desirable properties of the lubricant per se are retained in the final fluid to a far greater extent than is the case in blends of lubricants used heretofore. As a result, blends according to the invention show far lower change of viscosity with temperature, and remain homogeneous at lower temperatures, than hydraulic fluids heretofore available.

What is claimed is:

1. A hydraulic fluid consisting essentially of (a) from 10 to 30 per cent by weight of a mixture of trihydroxy mixed poly(oxyethylene-oxy-1.2 propylene) ethers of glycerol in which the oxyethylene groups represent from 20 to 80 mol per cent of the total oxyalkylene groups and in which there is an average of at least 8 oxyalkylene groups per glycerol molecule, (b) from 55 to 90 per cent of an acyclic monohydric alcohol containing from 3 to 10 carbon atoms per molecule and (c) up to 30 per cent of an acylic glycol containing from 2 to 6 carbon atoms per molecule.

2. A hydraulic fluid consisting essentially of (a) from 15 to 25 per cent by weight of a mixture of trihydroxy mixed poly(oxyethylene-oxy-1.2 propylene) ethers of glycerol in which the oxyethylene groups represent from 33 to 60 per cent of the total oxyalkylene groups and in which the mixture has an average molecular weight by acetyl value of at least 850, (b) from 65 to 80 per cent of an acyclic monohydric alcohol containing from 3 to 10 carbon atoms per molecule and (c) from 5 to 20 per cent of an acyclic glycol containing from 2 to 6 carbon atoms per molecule.

3. A hydraulic fluid consisting essentially of (a) from 15 to 25 per cent by weight of a mixture of trihydroxy mixed poly(oxyethylene-oxy-1.2 propylene) ethers of glycerol in which the oxyethylene groups represent about 50 mol per cent of the total oxyalkylene groups and in which there are a sufficient average number of oxyalkylene groups per glycerol nucleus that the mixture has a viscosity at 100° F. of about 200 centistokes, (b) from 65 to 80 per cent of an acyclic monohydric alcohol containing from 4 to 10 carbon atoms per molecule, and (c) from 5 to 20 per cent of an acyclic glycol containing from 2 to 6 carbon atoms per molecule.

4. A fluid according to claim 3 wherein the acyclic glycol is ethylene glycol.

5. A fluid according to claim 3 wherein the monohydric alcohol is dipropylene glycol monomethyl ether.

6. A fluid according to claim 5 wherein the acyclic glycol is ethylene glycol.

7. A fluid according to claim 6 in which the glycerol ether is present to an extent of about 20 per cent by weight, the monohydric alcohol about 70 per cent, and the acyclic alcohol about 10 per cent.

JOHN C. VAN HORN.
EDWARD O. OHLMANN.
JAMES D. KLINGER.
JOHN H. WRIGHT.

References Cited in the file of this patent

UNITED STATES PATENTS

| Number | Name | Date |
| --- | --- | --- |
| 2,425,755 | Roberts et al. | Aug. 19, 1947 |
| 2,425,845 | Toussaint et al. | Aug. 19, 1947 |
| 2,435,950 | Neher et al. | Feb. 10, 1948 |
| 2,448,664 | Fife et al. | Sept. 7, 1948 |